United States Patent [19]

Smith

[11] 4,252,673

[45] Feb. 24, 1981

[54] PREPARATION OF COLLOIDAL COBALT DISPERSIONS BY THE POLYMER-CATALYZED DECOMPOSITION OF COBALT CARBONYL AND COBALT ORGANOCARBONYL COMPOUNDS

[75] Inventor: Thomas W. Smith, Penfield, N.Y.

[73] Assignee: Xerox Corporation, Stamford, Conn.

[21] Appl. No.: 100,306

[22] Filed: Dec. 4, 1979

[51] Int. Cl.$^3$ .......................... B01J 31/02; C08K 3/08
[52] U.S. Cl. .................................. 252/430; 260/42.22;
430/286; 430/945; 568/451; 568/455; 568/454
[58] Field of Search ................. 252/430; 260/604 HF,
260/42.22; 430/945, 286

[56] References Cited

U.S. PATENT DOCUMENTS

| | | | |
|---|---|---|---|
| 3,228,881 | 1/1966 | Thomas | 260/39 M |
| 3,281,344 | 10/1966 | Thomas | 260/42.22 |
| 3,636,159 | 1/1972 | Solomon | 260/604 HF |
| 3,998,887 | 12/1976 | Allen | 260/604 HF |

*Primary Examiner*—John F. Niebling
*Attorney, Agent, or Firm*—H. M. Brownrout; E. O. Palazzo; P. P. Eichler

[57] ABSTRACT

There is disclosed a method for the preparation of a homogeneous, physically stable colloidal elemental cobalt dispersion of colloidal cobalt particles having a size in the range of from about 10 Angstrom units to about 200 Angstrom units. The method comprises preparing a solution of an active polymer in an inert solvent, and incrementally adding thereto a cobalt precursor, at a temperature at which the cobalt precursor will become bound to the active polymer and thermally decompose to produce elemental cobalt particles, the process being carried out in an inert atmosphere. Such dispersions may be used per se as catalysts, or may be used for the preparation of supported colloidal cobalt catalysts. The dispersions may be used for the preparation of ablative optical recording media.

40 Claims, No Drawings

PREPARATION OF COLLOIDAL COBALT DISPERSIONS BY THE POLYMER-CATALYZED DECOMPOSITION OF COBALT CARBONYL AND COBALT ORGANOCARBONYL COMPOUNDS

The present invention relates to a novel method for the preparation of homogeneous colloidal elemental cobalt dispersions, with the use of an active polymer in dilute solution in any of a large variety of suitable inert solvents, and with the use of any of a large variety of suitable cobalt precursors. The invention also relates to the homogeneous colloidal elemental cobalt dispersions, to their use as catalysts and for the preparation of supported cobalt catalysts, and to their use as materials for the preparation of ablative optical recording media.

In general, the preparation of the homogeneous colloidal elemental cobalt dispersions of the invention involves the thermal decomposition of a suitable cobalt precursor in a relatively dilute solution of an active polymer in an inert solvent for the cobalt precursor and the active polymer, the reaction being carried out in an inert atmosphere, where the thermal decomposition of the cobalt precursor occurring primarily with the precursor bound to the active polymer. The term "active polymer" as used herein and defined more particularly hereinafter refers generally to polymer molecules substantially each of which contain at least one reactive binding site for the cobalt precursor, at which sites the cobalt precursor molecules react directly and spontaneously to produce polymer-bound cobalt precursor. Such polymers are to be distinguished from "passive polymers" in that systems for the preparation of colloidal cobalt dispersions employing a passive polymer in solution require sufficient heat to remove at least one ligand from the cobalt precursor molecule before the cobalt precursor can become bound to the polymer; that is, the cobalt precursor molecules cannot react directly and spontaneously at the binding sites of the passive polymer. Preferably, the appropriate amount of the desired active polymer is dissolved in the appropriate amount of the desired inert solvent, and the solution is heated to the appropriate reaction temperature at which thermal decomposition of the polymer-bound cobalt precursor will occur, whereupon the appropriate amount of the desired cobalt precursor is added in appropriate increments and binds to the active polymer. This incremental addition is continued until the appropriate total amount of cobalt precursor has been added and permitted to thermally decompose.

Depending upon the choice of inert solvent, active polymer, cobalt precursor, and the preparative conditions, the homogeneous colloidal cobalt dispersions of the invention may contain colloidal cobalt particles having an overall size range of from about 10 Angstrom units to about 200 Angstrom units. Usually, however, the materials and conditions are selected such that any given dispersion produced will inherently have a relatively narrow particle size range within the overall range of from about 10 Angstrom units to about 200 Angstrom units, the materials and conditions being selected to produce a particle size range suitable for the intended end use of the dispersion. As a practical upper limit, the particle size is typically about 200 Angstrom units, since colloidal cobalt dispersions according to the invention having such a maximum particle size are typically very physically stable; that is, they do not settle in periods of years. If the colloidal cobalt particle size substantially exceeds about 200 Angstrom units, the dispersions tend to lack physical stability and may flocculate. The minimum particle size observed is about 10 Angstrom units. The maximum particle size observed is about 200 Angstrom units. Dispersions having a maximum particle size of about 150 Angstrom units have the best physical stability. The colloidal cobalt dispersions according to the invention are also very chemically stable if kept in an inert environment such as argon. Extensive oxidation of the cobalt particles will occur readily in the presence of oxygen.

Considering the possible catalytic utilities of the colloidal cobalt dispersions of the instant invention, it is known that the catalytic activity of colloidal cobalt particles is usually inversely proportional to the size of the particles. Accordingly, the most efficient particle size for catalytic use may be in the minimum size range. There are, however, two features of the use of the dispersions of this invention as catalysts which outweigh simple considerations of particle size in the efficiency of the catalyst. This invention provides a method for the preparation of independent unsupported colloidal particles of controlled narrow particle size distribution. These dispersions can subsequently be immobilized in an appropriate solid phase to yield a solid catalyst which contains a high loading of colloidal catalytic particles. In processes where the colloidal particles are generated in situ, i.e., on the support, by reduction of adsorbed ions, high percentages of catalyst loading cannot be achieved while maintaining a small particle size and a narrow particle size distribution. The most important feature of the catalytic activity of the dispersions of this invention is the role of the polymer bound to the particles' surfaces. In the presence of reducing gases, the functional sites on the polymer can react with cobalt iron atoms to generate the active catalytic species in a liquidous layer surrounding the particle. The colloidal cobalt dispersions may not only be used as catalysts per se; they may also be supported in a suitable solid support. Various reactions which may be catalyzed by the colloidal cobalt of the instant invention include hydroformylation reactions, oxidative coupling, and hydrogenation of alkenes.

For the preparation of ablative optical recording media, it is preferred generally to maximize the particle size up to about 100 Angstrom units; it is also desirable to maximize the ratio of colloidal cobalt to the active polymer, which may be accomplished by minimizing the amount of polymer and maximizing the amount of cobalt precursor during the incremental addition of the cobalt precursor. The basic reason for this is to maximize the light absorptivity of the oxidized cobalt films. Ablative optical recording media which may be prepared from colloidal cobalt dispersions according to the instant invention are described in copending U.S. patent application Ser. No. 054,204, filed July 2, 1979, entitled "Optical Disk", which application is assigned to the assignee of the instant application.

Considering the method of producing homogeneous colloidal cobalt dispersions according to the invention in greater detail, a suitable solvent is required which will dissolve the active polymer and the cobalt precursor, and the cobalt precursor becomes bound to the active sites of the polymer, where the cobalt precursor tends to decompose at a rate which is greatly in excess of the rate of any decomposition which may occur in respect of unbound cobalt precursor molecules in solution in the solvent.

Considering suitable active polymers in greater detail, it has already been indicated that a suitable active polymer is any polymer which contains one or more active sites which will react spontaneously, directly and rapidly with the cobalt precursor molecules themselves to yield polymer-bound cobalt precursor molecules. It is highly preferred that this binding occur much more rapidly than any substantial decomposition of unbound cobalt precursor molecules remaining dissolved in the solvent. It is also highly preferred that the polymer-bound cobalt precursor decomposes at a much more rapid rate than the unbound cobalt precursor. This insures that the cobalt particles will be generated primarily in the domain of the polymer molecules.

The ratio of active polymer to the amount of solvent employed is important. The concentration of the polymer must be below the critical entanglement concentration for the polymer molecules in solution, that is, each polymer molecule constitutes a discrete entity. Each such discrete polymer molecule may be referred to as an isolated domain. The lower the molecular weight of the polymer, the higher the critical entanglement concentration for the polymer, thus the greater the amount of polymer which can be used for a given volume of solvent.

As will be seen from the examples which follow, the cobalt precursor is preferably added in increments, so that a predetermined excess of dissolved unbound cobalt precursor is present in solution. The mechanism and general sequence of events in the reaction mixture is somewhat as follows. When a relatively small increment of cobalt precursor is added to a solution of the active polymer at an appropriate temperature, the active polymer first serves as a reactant, and the cobalt precursor molecules become bound to the active sites of the active polymer. This reaction preceeds nucleation, wherein a particle nucleus is formed which may either be cobalt or some more complex cobalt-containing species. Thus, at the outset of the entire sequence of events, the active polymer is a catalyst for the generation of cobalt particle nuclei or cobalt-containing particle nuclei, which are bound to the active sites of the polymer. At this point, the polymer has served its catalytic role for the nucleation of particles, and the reaction vessel contains randomly dispersed colloidal nuclei of cobalt or cobalt-containing particles bound to the active sites of the polymer. At nucleation, the decomposition becomes dominated by a new process, viz., disproportionation of cobalt precursor at the surfaces of the nuclei. The polymer stabilizes the nascent (growing) particles in the same domains in which the particles were nucleated, that is, collisional growth of the nascent particles is minimized. The principal role of the polymer now becomes stabilization of the newly formed colloidal cobalt system. Now, the reaction merely enlarges the particles as more icobalt precursor is added incrementally and reacts at the surface of the polymer-bound particles. There is a distinct transformation from the particle nucleation stage to the particle growth stage, evidenced by a dramatic change in the rate of evolution of carbon monoxide.

The number of polymer molecules, i.e., discrete polymer molecule domains, is directly proportional to the number of cobalt particles and inversely proportional to the cobalt particle size at any given volume of cobalt.

Suitable active polymers must, of course, be soluble in the solvent selected, preferably at about ambient temperature or slightly above for convenience, but in any event, necessarily at the temperature at which the cobalt precursor binding and cobalt precursor decomposition occur to produce colloidal cobalt particles. Numerous active polymers may be used in the method of the instant invention. Generally, the active polymers which are useful are Lewis bases. Such would include polymers bearing nucleophilic atoms or groups in the backbone or appendant thereto. One specific class of useful Lewis bases are polymers which contain nitrogen having a free non-bonding electron pair, these being termed, for convenience, nitrogen-containing Lewis bases. Typical active polymers of this type are vinyl polymers containing amine, amide, nitrile, oxime or imine groups. Typical examples of nitrogen-containing Lewis base active polymers are copolymers of (1) styrene, ethylene, butadiene, or derivatives thereof, with (2) acrylonitrile, acrylamide, N,N-dialkylacrylamides, vinylamine, and aromatic and aliphatic polyamides. Other Lewis bases which may not be of the nitrogen-containing nucleophilic type, but which are useful, are Lewis bases containing oxygen, phosphorus or sulfur. Typical of such other nucleophilic Lewis base active polymers are polymers containing amine oxide, phosphine, phosphine oxide, or sulfoxide residues. Specific examples of such materials are copolymers of para-styryldiphenylphosphine, para-styryldiphenylphosphine oxide, or vinylpyridine-N-oxide with styrene, and poly(phenylenesulfoxide).

Turning now to a consideration of suitable cobalt precursors, such are labile cobalt carbonyl and cobalt organocarbonyl compounds. In referring to such compounds, the term "labile" as used herein is intended to signify that the cobalt in the compound is attached to a ligand or ligands which will readily become dissociated from the molecule to leave elemental cobalt. An important feature of the labile cobalt precursor is the nature of its labile ligands. It is highly preferred that the ligands be volatile or otherwise easily removable from the reaction mixture. It is essential that the ligands do not interfere with or adversely affect the decomposition process and the stability of the resultant dispersion. Specific classes of such compounds include cobalt carbonyls, cobalt alkylcarbonyls, cobalt alkenylcarbonyls, cobalt nitrosyls. and cobalt acylcarbonyls. One specific class of such suitable cobalt precursors are cobalt carbonyls such as dicobalt octacarbonyl. This is one especially preferred material, for reasons of low cost and ready availability. A second class of suitable cobalt precursors, as mentioned, are cobalt alkylcarbonyls such as ethylcobalttetracarbonyl, which may be prepared by methods disclosed in the literature. A third class, as mentioned, are cobalt alkenylcarbonyls such as cyclopentadienylcobaltcarbonyl. A fourth class of suitable cobalt precursors, as mentioned, are cobalt nitrosyls such as nitrosyltricarbonyl cobalt, $Co(CO)_3(NO)$. A fifth class of suitable cobalt precursors are acylcobaltcarbonyls, such as acetylcobalttetracarbonyl.

If the selected cobalt precursor is a liquid, it can be added directly to the reaction mixture in the appropriate increments. On the other hand, if the cobalt precursor is a solid, it may first be dissolved in a small amount of a suitable solvent for incremental addition, or it may be added as a powder with, for example, a powder dosing funnel.

As has been mentioned, and as will be seen from the examples, the cobalt precursor should be added incrementally at suitable time intervals. As already indicated, the reason for this incremental addition is that two separate reactions can occur simultaneously. First, if too much cobalt precursor is added, some of it remains in solution, where it can decompose slowly. Decomposition of the unbound cobalt precursor is undesirable and should be minimized. Second, the preferred reaction is decomposition of the polymer-bound cobalt species, and the incremental addition and the rate thereof should be adapted to favor this reaction.

As a minimum first increment of cobalt precursor, an amount of precursor may initially be added which is just enough to saturate all of the active binding sites on the active polymer. However, it is preferred to add an excess of precursor up to about 5 to about 10 moles of cobalt precursor per mole of active sites, this preference existing because the excess unbound cobalt precursor does not decompose very readily compared to the polymer-bound cobalt precursor, and the excess is desirable to be readily available to react at the sites at which decomposition reaction has occurred, to facilitate nucleation and particle growth.

The subsequent increments are added based upon monitoring the evolution of carbon monoxide which occurs as a result of the decomposition of the cobalt precursor. When little carbon monoxide is being generated from the reaction mixture, it is apparent that the cobalt precursor present in the reaction mixture has substantially decomposed. Thus, it is desirable to wait until only a little or no carbon monoxide is being generated, then add another increment of up to about 5 to about 10 moles excess, and so on, until the addition of the final increment. Typically, it has been found that it is desirable to wait for a period of about 2 to about 4 hours between increments, depending upon the reaction rate, which is a function of the reagents, solvent, temperature and other conditions.

After the last increment has been added, it is generally convenient to continue heating, for example, for about 24 hours to evolve the last traces of carbon monoxide, indicating substantially total completion of the desired reaction. Of course, it is possible to add increments less frequently than indicated above. On a production basis, it would be preferred to add the cobalt precursor continuously at a rate determined to be sufficient to compensate for the consumption of the cobalt precursor in the reaction vessel, which is basically a continuous incremental addition.

The maximum amount of cobalt precursor which can effectively be added to the dispersion is determined experimentally by the point at which the total cobalt concentration in the dispersion can no longer be increased significantly. Immediately following particle nucleation, the particle size is at a minimum in any given system. One can discontinue adding additional cobalt precursor when the desired particle size has been achieved. If the aforementioned maximum amount of cobalt precursor is exceeded, undesirable results such as wider particle size ranges and precipitation of the colloidal dispersion ensue.

Turning now to a consideration of solvents which are suitable for preparing the colloidal cobalt dispersions of the instant invention, suitable solvents must be inert in the sense that they do not react with the cobalt precursor, nor with the polymer, and, of course, not with the resulting cobalt dispersion. The solvent must be capable of dissolving the active polymer, preferably at about ambient temperature, or slightly above for convenience, and necessarily at the reaction temperature. It should likewise be a good solvent for the cobalt precursor, preferably at about ambient temperature, and necessarily at the reaction temperature. Thus, practically speaking, the choice of a suitable solvent depends upon the cobalt precursor employed and the polymer employed, with due regard to the solubility and reactivity of these materials. A wide variety of inert solvents may be employed. Some solvents which have been found to be particularly useful include the following: (1) benzene and alkyl derivatives thereof such as monoalkylbenzenes and dialkylbenzenes; (2) halogenated derivatives of benzene such as chlorobenzene, odichlorobenzene, and p-dichlorobenzene; (3) straight chain and cyclic hydrocarbons, and particularly alkanes having from about 5 to about 20 carbon atoms, either straight chain or branched, such as decane, octane, hexadecane, pentane, iso-octane and neopentane, and cyclic alkanes such as cyclohexane, decalin and tetralin; (4) ethers and alcohols such as tetrahydrofuran, dialkyl ethers, ethyleneglycolmonomethylether, ethyleneglycolmonoethylether, butanol, hexanol and cyclohexanol; (5) esters such as alkylacetates, alkylpropionates and alkylbutyrates; and (6) ketones such as cyclohexanone, mesityl oxide, etc.

There is no particular upper limit on the boiling point of the solvent selected, but there is a practical lower limit, that being the temperature at which thermal decomposition of the polymer-bound cobalt precursor will proceed at the pressure employed. Concerning the melting point of the solvent, it must be a liquid at the reaction temperature of the thermal decomposition of the polymer-bound cobalt precursor, and it should preferably be liquid at ambient temperature or slightly above ambient temperature to facilitate making the reaction mixture and subsequent processing of the resulting dispersion after the reaction is complete.

The amount of solvent to be employed depends primarily upon the active polymer which is selected, and more particularly, upon the molecular weight thereof, bearing in mind that the concentration of the active polymer in the solvent solution must be below the critical entanglement concentration for the polymer molecules, so that each polymer molecule is a discrete, individual, isolated domain, not entangled with any other polymer molecules. As a practical matter, the lowest molecular weight polymer which would ordinarily be used would have a molecular weight of about 1,000, so as to be capable of forming sizable discrete domains. With such a low molecular weight active polymer, it is possible to use about 10 percent or more by weight of polymer based upon the weight of the solvent, based upon the critical entanglement concentration. Of course, one may use more solvent than the required minimum, if desired. As a practical matter, the maximum molecular weight of the active polymer which may ordinarily be used is about 1 million, and with such a high molecular weight polymer, a maximum polymer concentration of about 0.5 percent by weight based upon the weight of the solvent may be used; typically, with such high molecular weight polymers, the polymer concentration which is generally preferred may range from about 0.2 percent to about 0.5 percent by weight based upon the weight of the solvent, again, the limit being based upon the critical entanglement concentration. The molecular weight of the active polymer which is selected is chosen primarily with regard to the size of the colloidal cobalt particles desired; the higher concentrations of lower molecular weight range polymers will produce relatively small particles, whereas lower concentrations of higher molecular weight polymers will tend to yield larger colloidal particles. Typically, the molecular weight of the active polymers ranges from about 10,000 to about 100,000, in which case, the typical concentration of the active polymer in the solvent ranges, respectively, from about 5 percent down to about 2 percent by weight base upon the weight of the solvent.

Concerning the reaction temperature, the solution of active polymer and cobalt precursor is heated at a temperature at which the polymer-bound cobalt precursor decomposes to cobalt at a much more rapid rate than any unbound free cobalt precursor which may be in the solution decomposes. In practice, a suitable temperature range is from about 100° C. to about 170° C. for most systems, and the preferred temperature range for most systems is from about 130° C. to about 150° C. The optimal temperature for any given system may readily be determined simply by comparing the rate of carbon monoxide evolution from the system with and without the presence of the active polymer; at the optimum temperature, significant carbon monoxide evolution will occur readily in the presence of the active polymer but not readily in the absence of the active polymer. It is generally preferable to use the minimum temperature that will give a significant rate of decomposition of the polymer-bound cobalt precursor to cobalt since this also tends to minimize solution phase decomposition. The optimum temperature varies with the system and, as mentioned, is best simply determined experimentally. It is generally preferred to conduct the reaction at atmospheric pressure for convenience, although the reaction will proceed at a pressure above or below atmospheric pressure, which would, in turn, influence the boiling point of the selected solvent. The solvent, of course, must have a boiling point which is at least as high as the desired reaction temperature at the pressure employed. It is useful to select a solvent having a boiling point, at the pressure employed, such that the reaction may be carried out at reflux temperature, this being useful in that it assists the evolution of carbon monoxide. However, it is possible to operate at temperatures below reflux temperature.

As mentioned, the reaction should be carried out in an inert atmosphere, that is, inert in the sense that the atmosphere does not cause any adverse reactions in the system, either with respect to the solvent, the active polymer, the cobalt precursor or the product. While argon is conveniently used in the examples which follow, other inert atmospheres may be employed such as nitrogen, neon and helium, or the reaction may be carried out in a vacuum with sufficiently high boiling solvents and cobalt precursors.

It is to be particularly noted that the polymer is both a reactant and a catalyst for the decomposition of the cobalt precursor; it is not an inactive component which merely serves to stabilize independently nucleated particles.

The following examples are intended to illustrate, and not to limit, the scope of the instant invention.

EXAMPLE 1

This example illustrates the preparation of a colloidal dispersion of cobalt particles prepared with copoly(styrene/4-vinylpyridine)(1/0.05)molar as the active polymer.

5.0 g. of copoly(styrene/4-vinylpyridine)(1/0.05)molar having a styrene equivalent number average molecular weight of about 10,140 and a molecular weight distribution of about 1.92 is dissolved in 250 g. of water-free diethyleneglycoldiethyl ether at room temperature in a 500 ml. 4-neck round bottom flask. This represents a 1.8 weight percent polymer solution. The flask is equipped with a paddle stirrer, a thermometer long enough to have its bulb immersed in the liquid, a reflux condenser, and a combined gas inlet and rubber serum cap for introducing an inert atmosphere and reactants and to permit sampling the reaction mixture with a hypodermic syringe and needle. The reflux condenser is vented to the atmosphere through a drying tube containing a dessicant. The lower portion of the flask is immersed in a mineral oil bath as a heat source.

In preparation for the introduction of the cobalt precursor, dicobalt octacarbonyl, the solution in the flask is heated to 155° C. and the system is thoroughly purged with argon overnight for about 16 hours with the temperature being maintained at 155° C. 35 g. of dicobalt octacarbonyl dissolved in 50 g. of diethyleneglycoldiethyl ether is added in ten equal increments, maintaining a continuing argon flow and constant stirring. The increments are added every 2.5 hours. After adding the last increment, heating is continued for about 24 hours until the precursor has been completely decomposed, as conveniently determined by the absence of cobalt-carbonyl bands near 2,000 $cm^{-1}$ in the infrared spectrum of the dispersion. The dispersion is cooled to room temperature, and, under an inert atmosphere of argon, the dispersion is filtered to remove any large particles of cobalt or precipitated polymer, that is, anything flocculent. The filtration is carried out under pressure through a pad filter having pores of 2–4 microns and the filtrate is then bottled under argon in serum bottles for retention and further testing. The resultant dispersion contains 3.5% cobalt by weight and 1.5% polymer by weight, the cobalt particles being bound to the polymer molecules. The dispersion is comprised of particles ranging from about 60–120 Angstrom units in diameter.

The instant invention provides a method for the preparation of a homogeneous, physically stable colloidal elemental cobalt dispersion, suitable for use as a catalyst, comprising colloidal cobalt particles having a particle size within the range of from about 10 Angstrom units to about 200 Angstrom units dispersed in an inert liquid and stabilized by the presence of an active polymer to the reactive sites of which the cobalt particles are bound.

EXAMPLE 2

This example illustrates the preparation of a colloidal dispersion of cobalt particles using copoly(styrene/para-styryldiphenylphosphine) (9.3/0.7)molar as the active polymer.

Example 1 is repeated, the only significant difference being that 4.0 g. of the above-mentioned active polymer is substituted for the 5.0 g. of the polymer employed in Example 1. The resulting dispersion contains 3.2% cobalt by weight and 1.5% polymer by weight, the cobalt particles being bound to the polymer molecules. The dispersion is comprised of particles ranging from 50–100 Angstrom units in diameter.

EXAMPLE 3

This example illustrates the use of a colloidal cobalt dispersion according to the invention as a catalyst.

A colloidal cobalt dispersion prepared as in Example 2 is used to catalyze the hydroformylation of 1-hexene as follows. While constantly maintaining an inert atmosphere of argon, 100 g. of the dispersion is diluted to 500 ml. with diethyl ether in one liter capacity autoclave, and 86 g. of 1-hexene is added. The autoclave is closed and the argon is removed and replaced with a mixture of equal parts by volume of carbon monoxide and hydrogen. The temperature of the mixture is raised to 100° C., then the pressure in the autoclave is increased to 42 atmospheres with a 1:1 volume mixture of carbon monoxide and hydrogen, and the temperature and pressure are maintained for 4 hours. The pressure is then released and the reaction mixture is blanketed with an atmosphere of argon, then cooled to ambient temperature. A sample of the product of the reaction is removed and subjected to gas chromatographic analysis, which shows that 95% of the 1-hexene is converted to normal and iso heptaldehydes. The ratio of normal heptaldehyde to iso heptaldehyde is about 1.5:1.0 by weight.

EXAMPLE 4

This example illustrates the preparation and use of a supported colloidal cobalt particle catalyst according to the invention by means of suspension polymerization.

100 g. of colloidal cobalt dispersion prepared substantially as in Example 2 is vacuum concentrated to 50% by weight of nonvolatile material. To the concentrate is added 150 g. of styrene monomer and 2 g. of divinylbenzene monomer, resulting in a dispersion of the colloidal cobalt particles in the solution of the two monomers. 1.5 g. of stearic acid as a lubricant and 1.5 g. of azobisisobutyronitrile as a polymerization initiator in solution are dissolved in the dispersion.

A 2-liter round bottom flask equipped with a stirrer, reflux condenser and argon inlet is provided, with an oil bath as a heat source. Into the flask is introduced 500 ml. of deionized water, 0.1 g. of sodium lauryl sulfate as a surfactant, 1.5 g. of sodium polyacrylate as a dispersant and protective colloid, and 5 g. of sodium sulfate. After heating the contents of the flask to 80° C., the colloidal cobalt dispersion containing the monomers is added and the mixture is stirred vigorously at 80° C. for 4 hours under a constant argon atmosphere. During the 4 hour period, the styrene and divinylbenzene are polymerized to yield beads of cross-linked polystyrene of the order of 1 mm. in diameter containing 2.0 weight percent of cobalt particles having a diameter of about 50–100 Angstrom units. The reaction mixture is cooled to room temperature, filtered, and the product catalyst beads are vacuum dried at 60° C. to yield about 150 g. of the supported catalyst.

The catalyst prepared as above is used to catalyze the hydroformylation of 1-hexene as follows. While constantly maintaining an inert atmosphere of argon, 150 g. of catalytic beads is slurried in 500 ml. of cyclohexane in a one liter capacity autoclave, and 86 g. of 1-hexene is added. The autoclave is closed and the argon is removed and replaced with a mixture of equal parts by volume of carbon monoxide and hydrogen. The temperature of the mixture is raised to 100° C., then the pressure in the autoclave is increased to 42 atmospheres with a 1:1 volume mixture of carbon monoxide and hydrogen, and the temperature and pressure are maintained for 4 hours. The pressure is then released and the reaction mixture is blanketed with an atmosphere of argon, then cooled to ambient temperature. A sample of the product of the reaction is removed and subjected to gas chromatographic analysis, which shows that 90% of the 1-hexene is converted to normal and iso heptaldehydes. The ratio of normal heptaldehyde to iso heptaldehyde is about 2:1 by weight.

As illustrated by Example 4, the invention provides a method for the preparation of a bead-supported catalyst comprising colloidal cobalt particles having a particle size within the range of from about 10 Angstrom units to about 200 Angstrom units, said particles being bound to the reactive sites of an active polymer, and said particles and active polymer being supported in the beads, said method comprising supporting a liquid-dispersed colloidal elemental cobalt catalyst in beads, said beads being produced by suspension polymerization of at least one polymerizable monomer.

EXAMPLE 5

This example illustrates the use of copoly(styrene/-parastyryldiphenylphosphine oxide)(1/0.1)molar as the active polymer.

A reaction is carried out substantially as set forth in Example 1 with respect to the apparatus and conditions, except as follows. 5 g. of copoly(styrene/para-styryldiphenylphosphine oxide)(1/0.1)molar is dissolved in 250 g. of dry ethyleneglycoldiethylether. This represents a 2.0 weight percent polymer solution. The temperature is brought to 140° C. and maintained there during the ensuing reaction. A total of 35.0 g. of dicobalt octacarbonyl in 10 equal carbonyl increments is added, the increments being added about 2.5 hours apart, with continued heating for about 24 hours after the addition of the final increment. The resulting stable colloidal cobalt dispersion contains colloidal cobalt particles having a size range of about 50–100 Angstrom units in diameter. The dispersion contains 3.5 weight percent cobalt and 1.5 weight percent polymer.

Although the invention has been described herein with reference to various preferred embodiments, it is to be understood that variations and modifications may be resorted to as will be apparent to those skilled in the art. Such variations and modifications are to be considered within the purview and the scope of the claims appended hereto.

For example, it is usual to add the polymer to the solvent and dissolve it as the first step, at room temperature, or at some higher temperature which may be as high as the temperature at which the reaction is to occur. However, this procedure could be varied, for example, by adding the first increment of the cobalt precursor to the solvent first, and then dissolving the polymer in the solvent, subsequently heating to the reaction temperature. It is also possible, during the reaction, to add more polymer to provide additional reactive sites to increase the number of cobalt particles in the system. Also, additional polymer, over and above the earlier-mentioned approximately 10 percent or more maximum, may be added at the end of the reaction to enhance the stability of the dispersion, depending upon the intended purpose for the dispersion. It may be preferred to use two different polymers, one being inert and the other being active; the inert polymer would typically, but not necessarily, be added after nucleation, and serves to enhance the stability of the resulting dispersion. One may, of course, use a plurality of cobalt precursors, suitably adjusting the conditions. If it is planned to conduct a continued series of reactions using the same materials, it is possible to make a master nucleated batch of polymer-bound cobalt precursor for subsequent use as desired.

As another possible variation, the decomposition of the polymer-bound cobalt precursor, while preferably and most conveniently effected by heat, may also be effected by other stimuli such as actinic radiation.

Referring to the examples, all of the active polymers used are copolymers, but while this is preferable, it is not essential. Any suitable homopolymer containing active sites may be used. Preferably, however, it is desirable to copolymerize the monomer of the active moiety with an inert monomer, so that the inert moieties in the polymer chain reduce the number of active binding sites in the entire chain, the polymer thus containing moieties having some reactive sites and also moieties not containing reactive sites. Preferably, when a copolymer is employed, the copolymer contains less than about 10 mole percent of the active moieties. Desirably, copolymers may be prepared by polymerization of vinyl type monomers. Desirably, the inert monomer is selected from the group consisting of styrene, ethylene, methylmethacrylate and vinylacetate and the active monomer is selected from the group consisting of 2-vinylpyridine, 4-vinylpyridine, N-vinylimidazole, 2-vinylimidazole, 4,5-vinylimidazole, acrylonitrile, methacrylonitrile, N-vinylphthalimide, N-vinylsuccinimide, dimethylaminoethylmethacrylate, N-alkylacrylamides, para-styryldiphenylphosphine, and para-styryldiphenyl-phosphine oxide.

The colloidal cobalt dispersions, if stored, should be stored under an inert atmosphere to prevent oxidation of the cobalt particles and/or other undesired reactions.

What is claimed is:

1. A method for the preparation of a homogeneous, physically stable colloidal elemental cobalt dispersion comprising:
   (a) preparing a solution in an inert solvent of an active polymer, the concentration of the polymer being below its critical entanglement concentration, to provide discrete reactive binding sites to which cobalt precursor molecules can become bound;
   (b) incrementally adding, at suitable time intervals, a labile cobalt precursor, the molecules of which rapidly become bound to the active sites of the polymer;
   (c) maintaining a temperature which is sufficiently high to decompose the polymer-bound cobalt precursor much more rapidly than any cobalt precursor which may remain unbound in the solution;
   (d) continuing the addition of increments of cobalt precursor to yield colloidal cobalt particles of the desired size within the range of from about 10 Angstrom units to about 200 Angstrom units, the cobalt particles being bound to the active polymer molecules;
   (e) steps (b), (c) and (d) being carried out in an inert atmosphere.

2. A method as set forth in claim 1 wherein the final increment, after decomposition, yields colloidal cobalt particles having a maximum size of about 150 Angstrom units.

3. A method as set forth in claim 1 wherein the final increment, after decomposition, yields colloidal cobalt particles, some of which have a maximum size of about 100 Angstrom units.

4. A method as set forth in claim 1 wherein the cobalt precursor increments are added in an amount of from about 5 to 10 moles of cobalt precursor per mole of reactive binding sites.

5. A method as set forth in claim 1 wherein the cobalt precursor increments are added when only a little or no carbon monoxide is being generated.

6. A method as set forth in claim 1 wherein the cobalt precursor increments are added from about 2 to about 4 hours apart.

7. A method as set forth in claim 1 which is carried out at about atmospheric pressure.

8. A method as set forth in claim 1 wherein the addition of increments of the cobalt precursor is continuous, at a rate sufficient to compensate for the consumption of the cobalt precursor already added.

9. A method as set forth in claim 1 wherein the sufficiently high temperature is reflux temperature.

10. A method as set forth in claim 1 wherein the sufficiently high temperature is within the range of from about 100° C. to about 170° C.

11. A method as set forth in claim 10 wherein the temperature is within the range of from about 130° C. to about 150° C.

12. A method as set forth in claim 1 wherein the sufficiently high temperature is the minimum temperature that will cause a significant rate of decomposition of the polymer-bound cobalt precursor.

13. A method as set forth in claim 1 wherein decomposition of the polymer-bound cobalt precursor is decomposed by actinic radiation instead of heat.

14. A method as set forth in claim 1 wherein additional active polymer is added during the reaction.

15. A method as set forth in claim 1 wherein additional active polymer is added after the reaction is complete.

16. A method as set forth in claim 1 wherein the active polymer is soluble in the inert solvent at about ambient temperature.

17. A method as set forth in claim 1 wherein the active polymer is a Lewis base.

18. A method as set forth in claim 1 wherein the active polymer is a homopolymer.

19. A method as set forth in claim 1 wherein the active polymer is a copolymer of an active monomer and an inert monomer.

20. A method as set forth in claim 19 wherein said copolymer contains less than about 10 mole% of active moieties.

21. A method as set forth in claim 19 wherein said copolymer is prepared by polymerization of vinyl type monomers.

22. A method as set forth in claim 19 wherein the inert monomer is selected from the group consisting of styrene, ethylene, methylmethacrylate and vinylacetate and the active monomer is selected from the group consisting of 2-vinylpyridine, 4-vinylpyridine, N-vinylimidazole, 2-vinylimidazole, 4,5-vinylimidazole, acrylonitrile, methacrylonitrile, N-vinylphthalimide, N-vinylsuccinimide, dimethylaminoethylmethacrylate, N-alkylacrylamides, parastyryldiphenylphosphine, and para-styryldiphenylphosphine oxide.

23. A method as set forth in claim 19, said copolymer being selected from the group consisting of copoly(styrene/vinylpyridine), copoly(styrene/para-styryldiphenylphosphine), and copoly(styrene/para-styryldiphenylphosphine oxide).

24. A method as set forth in claim 1 wherein said active polymer has a molecular weight of from about 1000 to about 1 million.

25. A method as set forth in claim 24 wherein the active polymer concentration in the inert solution is, respectively, from about 10 percent or more to about 0.2–0.5 percent by weight based upon the weight of the solvent.

26. A method as set forth in claim 1 wherein said active polymer has a molecular weight of from about 10,000 to about 100,000.

27. A method as set forth in claim 26 wherein the active polymer concentration in the inert solution is, respectively, from about 5 percent to about 2 percent by weight based upon the weight of the solvent.

28. A method as set forth in claim 1 wherein said inert solvent is a liquid at about ambient temperature.

29. A method as set forth in claim 1 wherein said cobalt precursor is a cobalt carbonyl.

30. A method as set forth in claim 29 wherein said cobalt carbonyl is dicobalt octacarbonyl.

31. A method as set forth in claim 1 wherein said cobalt precursor is a cobalt alkylcarbonyl.

32. A method as set forth in claim 1 wherein said cobalt precursor is a cobalt alkenylcarbonyl.

33. A method as set forth in claim 1 wherein said cobalt precursor is an cobalt nitrosyl.

34. A method as set forth in claim 1 wherein said cobalt precursor is a cobalt acylcarbonyl.

35. A homogeneous, physically stable colloidal elemental cobalt dispersion, suitablle for use as a catalyst, comprising colloidal cobalt particles having a particle size within the range of from about 10 Angstrom units to about 200 Angstrom units dispersed in an inert liquid and stabilized by the presence of an active polymer to the reactive sites of which the cobalt particles are bound, said dispersion being prepared by the method of claim 1.

36. A dispersion as set forth in claim 35 having a maximum colloidal cobalt particle size of about 150 Angstrom units.

37. A dispersion as set forth in claim 35 having a maximum colloidal cobalt particle size of about 100 Angstrom units.

38. A dispersion as set forth in claim 35 wherein the weight ratio of cobalt to polymer is within the range of from about 90:100 to about 90:100.

39. A method for the preparation of a bead-supported catalyst comprising colloidal cobalt particles having a particle size within the range of from about 10 Angstrom units to about 200 Angstrom units, said particles being bound to the reactive sites of an active polymer, and said particles and active polymer being supported in the beads, said method comprising supporting a liquid-dispersed colloidal elemental cobalt catalyst as set forth in claim 35 in beads, said beads being produced by suspension polymerization of at least one polymerizable monomer.

40. A bead-supported catalyst as set forth in claim 39 wherein the beads comprise cross-linked polystyrene.

* * * * *